May 15, 1951      L. B. PELTIER, JR      2,553,207
RESCUE APPARATUS

Filed Dec. 28, 1945      2 Sheets-Sheet 1

Louis B. Peltier, Jr. INVENTOR.

BY

HIS PATENT ATTORNEY

May 15, 1951   L. B. PELTIER, JR   2,553,207
RESCUE APPARATUS
Filed Dec. 28, 1945   2 Sheets-Sheet 2
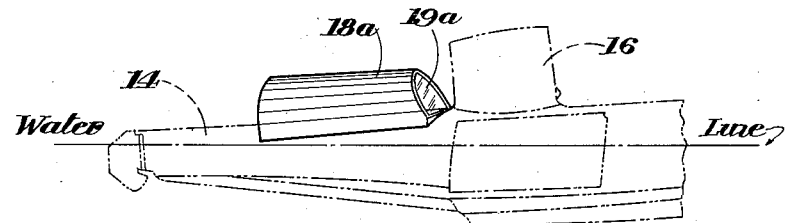
Fig.3
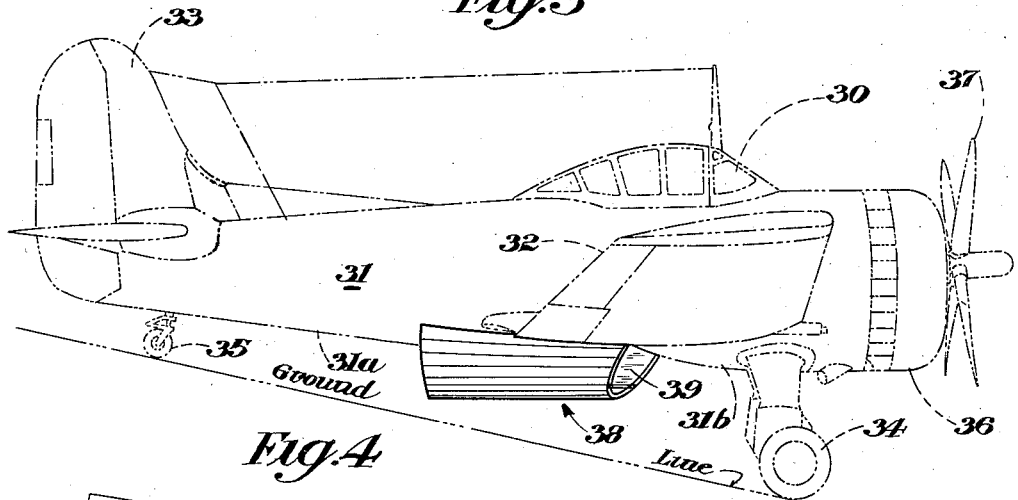
Fig.4
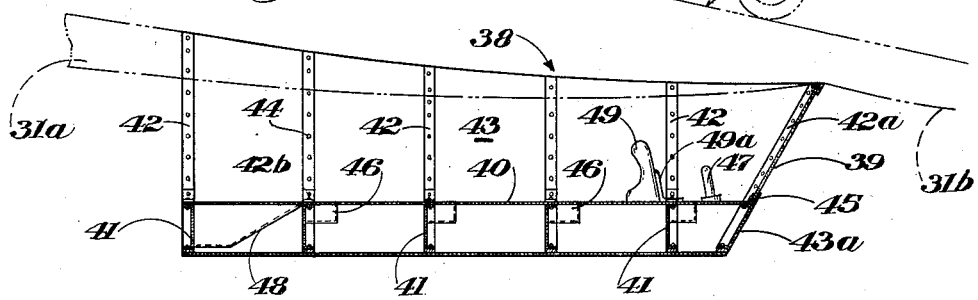
Fig.5
Fig.6
Louis B. Peltier, Jr. INVENTOR.
BY
HIS PATENT ATTORNEY Patented May 15, 1951

2,553,207

UNITED STATES PATENT OFFICE 2,553,207

RESCUE APPARATUS

Louis B. Peltier, Jr., Columbus, Ohio, assignor to Curtiss-Wright Corporation, a corporation of Delaware Application December 28, 1945, Serial No. 637,567

3 Claims. (Cl. 244—118)

The present invention relates to rescue apparatuse and more particularly to aircraft and accessory equipment by which it may be readily and quickly converted from its normal function into an aircraft of the rescue type.

Military aircraft are frequently disabled while in flight and are forced to land or crash in isolated regions, or at sea. Such forced landings are not uncommon following military combat, or exhaustion of the fuel supply, as the result of damages or due to being in the air for an extended period. In many instances aircraft which are forced to land at sea are not adapted to sustain themselves upon the water and as a result their occupants are required to use emergency flotation equipment to support themselves until such time as they may be rescued. The use of aircraft for carrying out the rescue of victims of such forced or crash landings has greatly increased during recent military operations, and while aircraft have proven more efficient and expeditious in such operations than most other types of vehicles or vessel, there is a distinct need for more suitable rescue craft and equipment.

It is accordingly a principal object of this invention to provide a rescue apparatus in the form of a protective cell or enclosure which is adapted to be readily attached to the exterior of a conventional aircraft and within which cell or enclosure a person may be readily transported.

It is frequently impossible for a survivor who may have been exposed to the elements, or to the temperature of the seas for a long period, or who may have otherwise been injured, to climb aboard an aircraft of the conventional type. The boarding of such aircraft by a survivor is made particularly difficult by the necessity of his climbing up into the cockpit or the fuselage of the craft in his weakened condition. Accordingly, it is another object of the present invention to provide a rescue aircraft having a cell or an enclosure attached thereto which is positioned so as to be adjacent or contiguous to the surface upon which the airplane is supported or at rest.

In carrying out this latter objective, it is a further purpose of this invention to provide a rescue enclosure which includes means by which a survivor may assist himself in climbing into, or becoming positioned within, the rescue enclosure. Other objects of the invention are directed to: the general arrangement of the rescue enclosures; their relationship to the adjacent components of the several types of aircraft to which they are adapted; their construction and facilities for assisting an occupant in maintaining his position within the cell; and to providing for his comfort and visibility while being carried therein.

Other objects and advantages of this invention will become apparent to those skilled in the art after reading the present description together with the accompanying drawings forming a part hereof in which:

Fig. 3 is a view from the side of a central float of a seaplane showing a modified form of rescue cell attached thereto;

Fig. 4 is a side view of a land type airplane showing a modified form of rescue cell attached to the fuselage thereof;

Fig. 5 is a longitudinal sectional view of the cell of Fig. 4; and

Fig. 6 is an end view of the rescue cell of Figs. 4 and 5 as viewed looking forward.

Figure 1:
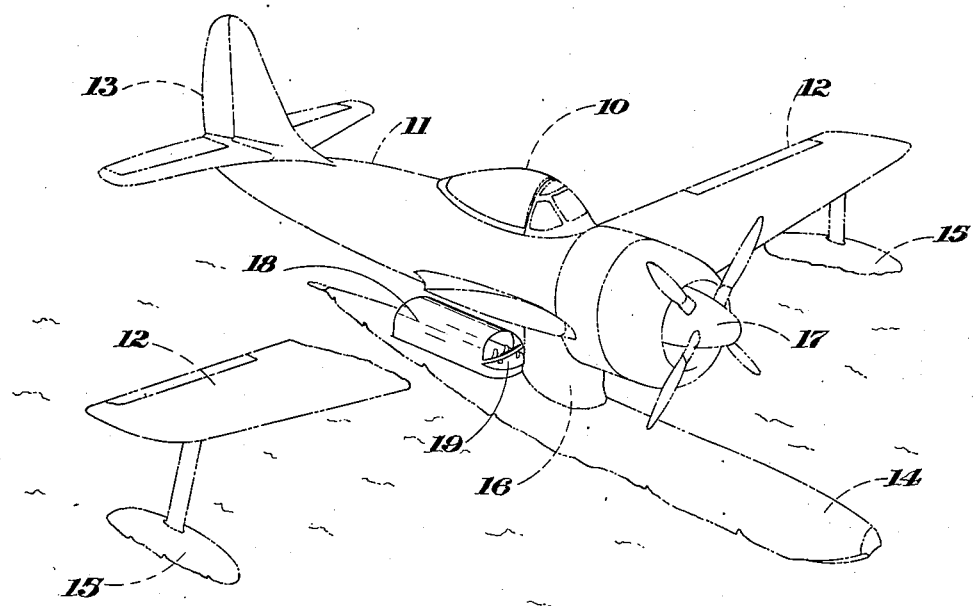
Fig. 1 is a perspective view of a seaplane afloat on the water provided with a rescue enclosure of the improved type.

Referring to Fig. 1, there is shown an aircraft of the seaplane type provided with a pilot's compartment 10, a fuselage 11, sustaining surfaces 12 and an empennage or tail group 13. To facilitate alighting and taking-off from the surface of the water this airplane is provided with a main or central float 14 and a pair of laterally disposed wing or stabilizing floats 15 attached to the outer portions of the wing 12. The fuselage 11 and the main float or pontoon 14 are interconnected by a strutcural pedestal 16 extending below the fuselage just aft of the power plant and propulsion unit 17. A portion of the right wing 12 has been broken away to show the rescue cell 18, which is disposed on the upper surface of the main float 14 immediately aft of the pedestal 16. The rescue cell 18 is preferably of semi-circular cross-section, being of sufficient length to accommodate a man and is provided at its forward end with a windshield or rounded transparent enclosure 19. The aft end of the enclosure may remain open for access and egress and the enclosure is preferably provided with quick detachable means by which it can be connected to or detached from the upper surface of the float 14.

Figure 2:
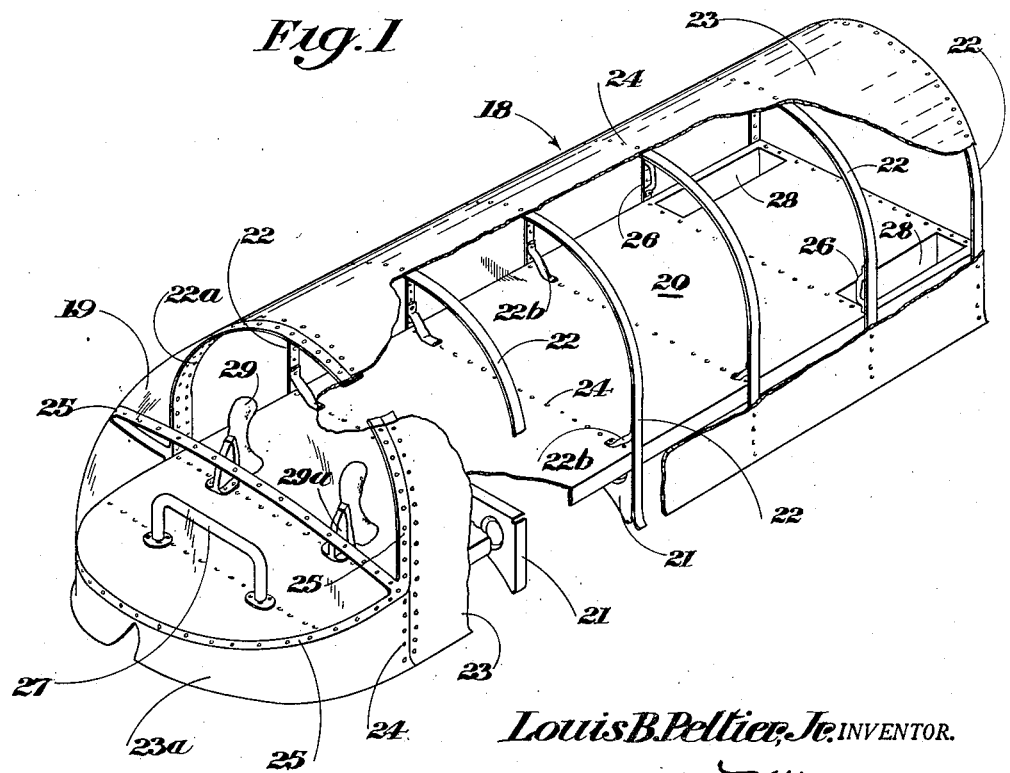
Fig. 2 is a perspective detail view, partially broken away, of the rescue enclosure shown on the seaplane of Fig. 1.

The rescue cell 18, as shown in greater detail in the perspective view in Fig. 2, is composed of a floor sheet 20 riveted to the flanged bulkhead or saddle members 21, as by the rivets 24. A plurality of spaced semi-circular formers or framing ribs 22 are riveted to the flanged edges of both the floor sheet 20 and the bulkheads 21 and are further stiffened by the angle brackets 22b at the side of the floor. A forward former 22a, of somewhat greater width, is provided, together with the formers 22, for the cover sheet or skin 23, attached thereto by the rivets 24. To the forward portion of the front former 22a there is attached a part-spherical or rounded frame 25 for the support of the aforementioned transparent windshield 19. The lower member of the frame 25 is riveted to the flange at the rounded forward end of the floor sheet 20 and has attached therebelow a fairing or apron sheet 23a by means of the rivets 24.

In order to facilitate the entrance of a weakened survivor into the rescue cell 18 hand grips 26 are provided, being attached to the rearwardly disposed formers 22, and when the occupant has positioned himself fully within the enclosure he may grasp the hand rail or pull bar 27 attached to the floor and bulkhead in the forward portion of the cell. Between the two rearmost panels 21 depressed pockets 28 are provided through the floor at the lateral sides of the sheet 20, to both assist the survivor in grasping the rear portion in climbing into the cell, and within which to place his feet in order to brace himself during take-off, flight or landing of the craft while he is in his forwardly disposed or flight position with his head within or adjacent the windshield portion 19. To further assist the occupant in bracing himself and preventing his being thrown about in a weakened condition within the cell, particularly during take-off and landing in rough water, uneven ground, or flight in rough air, there is provided a pair of padded shoulder braces 29 attached to the floor 20 and adjacent bulkhead by means of the brackets 29a.

A modified form of rescue cell 18a is shown in Fig. 3 mounted upon the upper aft portions of the float 14 to the rear of the pedestal 16. The cell 18a is preferably provided with an angular windshield portion 19a which may be provided with a flat piece of plastic transparent material, such as a methyl methacrylate or acrylic sheet, extending from the floor portion to the roof of the enclosure. This cell 18a is preferably provided with similar accessories as described above for the cell 18 and it is also preferably equipped with suitable means for its rapid installation and removal from the float body 14.

Referring now to Figs. 4, 5 and 6, there is shown a modified form of rescue enclosure which is adapted to be detachably suspended from the belly portion of the fuselage of a land type aircraft. This airplane is provided with a conventional pilot cockpit 30, fuselage 31, having aft and forward belly portions 31a and 31b respectively, and main sustaining surfaces 32. This aircraft may also be provided with a conventional empennage 33, the main forward landing gear 34, a tail wheel 35, and a cowl 36 enclosing the power plant which drives a tractor propeller 37. A semi-circular rescue enclosure 38, of substantially similar external configuration as the enclosure 18a, but having its rounded portion facing downwardly and of a resulting different internal floor construction, is suspended from the belly portions 31a and 31b of the fuselage.

The rescue cell 38, as shown in Figs. 5 and 6, is provided with a relatively flat inclined forward windshield portion 39, and a floor sheet 40 extending from its open semi-circular rearward end to the forward end enclosed by the windshield 39. The cell is constructed of a plurality of longitudinally spaced substantially semi-circular formers or framing ribs 42 and 42a within the lower portions of which there are disposed and riveted the segmental shaped floor bulkheads 41. The latter may preferably be formed from sheet material into flanged shapes of segmental cross-section and their junction with the formers 42 and the floor sheets 40 are stiffened by the intermediate obtuse angle brackets 42b. The entire frame thus constructed is covered by a covering sheet or skin material 43, riveted thereto as at 44, and having its upper edge together with the upper end of the former 42 cut to fit their intersections with the curved fuselage at 31a. The forward portion of the enclosure is formed by the forward former 42a and the bulkhead 43a which also encloses the forward portion of the cell beneath the windshield 39 mounted within the windshield frame 45.

In order to assist a person to enter the aft or open end of the rescue cell 38 the floor is provided with a plurality of hand grip depressions 46, a pair of upright pull handles 47 and enlarged detent portions 48 at the aft end of the cell which may both be used for initial gripping by a survivor and after he has become fully positioned within the cell his feet may be disposed within the pockets 48 to brace himself for flight conditions. The enclosure 38 is also preferably provided with a pair of padded shoulder braces 49 attached to the floor sheet 40 and the adjacent floor support 41 by the brackets 49a. Attachment brackets 50 are provided at the upper terminals of several of the formers 42 for engagement with the external lugs 51 which are preferably attached to the fuselage portion 31a of the aircraft. Matching holes 52 are provided in the members 50 and 51, within which are inserted readily detachable locking pins by means of which the described rescue enclosures may be quickly attached to, or removed from, the aircraft.

It will accordingly be noted that the present invention provides rescue enclosures of an improved type which are readily entered by a survivor in a weakened condition either from the water or from the ground with relatively lesser efforts than heretofore required by prior rescue apparatus. The present cell is also provided with improved facilities after the cell has been entered. Both in the case of the cell 18 mounted upon the seaplane float in Fig. 1, and the cell 38 suspended from the fuselage of the land plane of Fig. 4, it will be apparent that the entrance opening and the rear edge of the floor of each of these cells are disposed closely adjacent the surface of the medium upon which the survivor may be floating or lying, and in either case his body will be required to be lifted only a relatively short distance either by himself or with the assistance of others. The invention is adapted to any type of aerial craft including airplanes, air ships, autogiros, helicopters and others and is not limited to the types shown and described. It is, however, desirable to locate the cell on the craft in a position where it is contiguous to the ground or water line when the craft is at rest and also in a position thereon which is not too distant from the center of gravity of the craft.

Other forms and modifications of the present invention, both with respect to their general arrangement and the details of the respective parts, which will become obvious to those skilled in the art, are intended to fall within the scope

I claim:

1. A rescue cell for detachable connection to an aircraft, comprising a transversely arcuate framework faired onto the uninterrupted exterior surface of an aircraft body, enclosure means attached to said framework enclosing the laterally exposed portions thereof, a transparent windshield portion disposed across the forward end of said enclosure means, a floor surface within said cell disposed between said body exterior surface and said enclosure means, said enclosure means being open at its rear end for access thereto by a human being.

2. Aerial rescue apparatus adapted for detachable connection to an aircraft component comprising: an elongated enclosure having a laterally exposed skin surface faired to the aircraft component; a floor surface within said enclosure; said enclosure having a transparent forward portion and an open trailing portion; hand grasp means carried by said enclosure to facilitate the entrance of a person thereinto; grip means carried by said enclosure to facilitate the person maintaining a prone position within said enclosure; foot rest means associated with said enclosure floor to facilitate the person maintaining said prone position within said enclosure; and brace means extending from said floor surface adapted to bear against said person to prevent his forward movement beyond the said prone position resulting from movement of the aircraft component.

3. Rescue apparatus for detachable connection to an aircraft body adapted for flotation upon a water surface comprising an elongated rescue compartment having a transversely arcuate framework detachably faired upon an uninterrupted exterior surface of the aircraft body, enclosure means attached to said framework enclosing the laterally exposed portions thereof, a transparent windshield portion disposed across the forward end of said enclosure means, a horizontal floor surface within said compartment contiguously disposed with respect to said water surface in the floating condition of said aircraft body, said enclosure means being open at its rear end for access thereto by the entire body of a person, a hand grasp attached to said compartment adjacent said rear access opening said compartment floor, hand grasp and rear access opening arranged in respect to said body in such manner that said hand grasp is adapted to be conveniently reached by a person afloat upon said water surface to facilitate his crawling unassisted through said access opening into said compartment for disposition in a face down prone position upon said compartment floor during a rescue flight of the aircraft.

LOUIS B. PELTIER, Jr.

REFERENCES CITED

The following references are of record in the file of this patent:

UNITED STATES PATENTS

| Number | Name | Date |
| --- | --- | --- |
| 1,547,119 | Hall | July 21, 1925 |
| 2,332,158 | Magill et al. | Oct. 19, 1943 |

FOREIGN PATENTS

| Number | Country | Date |
| --- | --- | --- |
| 139,295 | Great Britain | Mar. 4, 1920 |
| 510,539 | France | Sept. 8, 1920 |
| 510,699 | France | Sept. 10, 1920 |